(12) United States Patent
Fries

(10) Patent No.: US 9,120,204 B2
(45) Date of Patent: Sep. 1, 2015

(54) POLYCRYSTALLINE SUPERHARD MATERIAL

(75) Inventor: Robert Fries, Springs (ZA)

(73) Assignee: Element Six Abrasives S.A., Luxembourg (LU)

( * ) Notice: Subject to any disclaimer, the term of this patent is extended or adjusted under 35 U.S.C. 154(b) by 191 days.

(21) Appl. No.: 13/641,390

(22) PCT Filed: Apr. 20, 2011

(86) PCT No.: PCT/IB2011/051735
§ 371 (c)(1),
(2), (4) Date: Jan. 30, 2013

(87) PCT Pub. No.: WO2011/132166
PCT Pub. Date: Oct. 27, 2011

(65) Prior Publication Data
US 2013/0199107 A1 Aug. 8, 2013

(30) Foreign Application Priority Data
Apr. 23, 2010 (GB) .................................. 1006821.1

(51) Int. Cl.
*B24D 3/00* (2006.01)
*B24D 3/34* (2006.01)
(Continued)

(52) U.S. Cl.
CPC .................. *B24D 3/348* (2013.01); *B01J 3/062* (2013.01); *C22C 1/051* (2013.01); *C22C 26/00* (2013.01); *E21B 10/567* (2013.01); *B01J 2203/061* (2013.01); *B01J 2203/062* (2013.01);
(Continued)

(58) Field of Classification Search
CPC ............... B24D 3/00; C09K 3/14; C08J 5/14; E21B 10/567
See application file for complete search history.

(56) References Cited

U.S. PATENT DOCUMENTS 6,059,949 A * 5/2000 Gal-Or et al. ................. 204/484
6,258,237 B1 7/2001 Gal-Or et al.
(Continued)

FOREIGN PATENT DOCUMENTS

EP 0043541 A1 1/1982
EP 1958688 A1 8/2008
(Continued)

OTHER PUBLICATIONS

Vander Voort, George F. (1999). Metallography—Principles and Practice—6.11 Contiguity. ASM International. Online version available at: http://app.knovel.com/hotlink/pdf/id:kt00AE6W01/metallography-principles/contiguity.*
(Continued)

*Primary Examiner* — Pegah Parvini
*Assistant Examiner* — Alexandra M Moore
(74) *Attorney, Agent, or Firm* — Bryan Cave LLP

(57) ABSTRACT

A polycrystalline superhard material comprises a sintered mass of superhard grains having a mean superhard grain contiguity of at least 62 percent and at most 92 percent. There is also disclosed a method of making such a polycrystalline superhard material. The method comprises providing a precursor body comprising superhard grains and interstices between the superhard grains, and introducing additive particles into the interstices to form a pre-sinter body. The pre-sinter body is submitted to a temperature and pressure at which superhard material is thermodynamically stable, sintering it and forming polycrystalline superhard material.

8 Claims, 4 Drawing Sheets

(51) Int. Cl.
*B01J 3/06* (2006.01)
*C22C 1/05* (2006.01)
*C22C 26/00* (2006.01)
*E21B 10/567* (2006.01)

(52) U.S. Cl.
CPC ..... *B01J2203/066* (2013.01); *B01J 2203/0645* (2013.01); *B01J 2203/0655* (2013.01); *B01J 2203/0685* (2013.01); *B22F 2998/10* (2013.01)

(56) References Cited

U.S. PATENT DOCUMENTS

| 6,699,808 | B1 | 3/2004 | Schwertfeger et al. | |
| 7,516,804 | B2 | 4/2009 | Vail | |
| 2004/0023035 | A1* | 2/2004 | Brandon et al. | 428/411.1 |
| 2004/0053767 | A1 | 3/2004 | Schwertfeger et al. | |
| 2007/0234646 | A1* | 10/2007 | Can et al. | 51/307 |
| 2008/0206576 | A1* | 8/2008 | Qian et al. | 428/446 |
| 2010/0005728 | A1 | 1/2010 | Bellin | |

FOREIGN PATENT DOCUMENTS

| WO | 2009147629 A1 | 12/2009 |
| WO | 2010140108 A1 | 12/2010 |
| WO | 2011132166 A2 | 10/2011 |

OTHER PUBLICATIONS

Tsai et al., Fabrication of Diamond Schottky Emitter Array by Using Electrophoresis Pre-Treatment and Hot-Filament Chemical Vapor Deposition, Diamond and Related Materials; vol. 16, Issues 4-7, Apr.-Jul. 2009, pp. 1398-1402.

* cited by examiner

POLYCRYSTALLINE SUPERHARD MATERIAL

FIELD

This disclosure relates to polycrystalline superhard material, particularly but not exclusively to polycrystalline diamond (PCD) material, elements comprising same and method for making same.

BACKGROUND

Cutter inserts for machine and other tools may comprise a layer of polycrystalline diamond (PCD) or polycrystalline cubic boron nitride (PCBN) bonded to a cemented carbide substrate. PCD and PCBN are examples of superhard material, also called superabrasive material, which have a hardness value substantially greater than that of cemented tungsten carbide.

Components comprising PCD are used in a wide variety of tools for cutting, machining, drilling or degrading hard or abrasive materials such as rock, metal, ceramics, composites and wood-containing materials. PCD comprises a mass of substantially inter-grown diamond grains forming a skeletal mass, which defines interstices between the diamond grains. PCD material comprises at least about 80 volume % of diamond and may be made by subjecting an aggregated mass of diamond grains to an ultra-high pressure of greater than about 5 GPa and temperature of at least about 1,200 degrees centigrade in the presence of a sintering aid, also referred to as a catalyst material for diamond. Catalyst material for diamond is understood to be material that is capable of promoting direct inter-growth of diamond grains at a pressure and temperature condition at which diamond is thermodynamically more stable than graphite. Some catalyst materials for diamond may promote the conversion of diamond to graphite at ambient pressure, particularly at elevated temperatures. Examples of catalyst materials for diamond are cobalt, iron, nickel and certain alloys including any of these. PCD may be formed on a cobalt-cemented tungsten carbide substrate, which may provide a source of cobalt catalyst material for the PCD. The interstices within PCD material may be at least partly be filled with the catalyst material. A disadvantage of PCD containing certain catalyst materials for diamond as a filler material may be its reduced wear resistance at elevated temperatures.

Components comprising PCBN are used principally for machining metals. PCBN material comprises a sintered mass of cubic boron nitride (cBN) grains. The cBN content of PCBN materials may be at least about 40 volume %. When the cBN content in the PCBN is at least about 70 volume % there may be substantial direct contact among the cBN grains. When the cBN content is in the range from about 40 volume % to about 60 volume % of the compact, then the extent of direct contact among the cBN grains is limited. PCBN may be made by subjecting a mass of cBN grains together with a powdered matrix phase, to a temperature and pressure at which the cBN is thermodynamically more stable than the hexagonal form of boron nitride, hBN. PCBN is much less wear resistant that PCD, which may limit its scope of application.

U.S. Pat. No. 7,516,804 discloses a superabrasive element comprising a mass of polycrystalline diamond including ultra-dispersed diamond grain structures present in an amount greater than zero weight percent and less than about 75 weight percent of the mass of polycrystalline diamond.

PCT publication number WO2009/147629 discloses a method for making PCD having an enhanced diamond contiguity and density.

There is a need for a polycrystalline superhard material having enhanced wear resistance, as well as a method for making it.

SUMMARY

Viewed from a first aspect there is provided a method for making polycrystalline superhard material comprising providing a precursor body comprising superhard grains and interstices between the superhard grains, and introducing additive particles into the interstices to form a pre-sinter body; and subjecting the pre-sinter body to a temperature and pressure at which the superhard material is thermodynamically stable, sintering it and forming polycrystalline superhard material.

In one embodiment, the method includes urging, driving or drawing additive particles into the interstices to form a pre-sinter body; and subjecting the pre-sinter body to a temperature and pressure at which the superhard material is thermodynamically stable, sintering it and forming polycrystalline superhard material.

In one embodiment, the method includes urging additive particles into the interstices by means of an applied electric field. In one embodiment, the method includes urging additive particles into the interstices by means of electrophoresis.

In one embodiment, the precursor body comprises diamond grains and the method includes subjecting the pre-sinter body in the presence of a catalyst material for diamond to a pressure and temperature at which diamond is more thermally stable than graphite. In one embodiment, the pressure is at least about 5.5 GPa and the temperature is at least about 1,250 degrees centigrade.

In one embodiment, the precursor body comprises cBN grains and the method includes subjecting the pre-sinter body a pressure and temperature at which cBN is more thermally stable than hexagonal boron nitride (hBN). In one embodiment, the pressure is at least about 2 GPa and the temperature is at least about 900 degrees centigrade.

In one embodiment, the method includes treating the additive particles to provide them with an electric charge.

In some embodiments, the additive, particles comprise diamond, graphite, cBN, hBN, metal or ceramic material. Non-limiting examples of metal additive particles include particles of a metal catalyst material for diamond, such as cobalt. Non-limiting examples of ceramic additive particles include particles of oxide, such as zirconia; particles of carbide, such as silicon carbide, tungsten carbide or vanadium carbide; or particles of nitride, such as boron nitride or titanium nitride. In one embodiment, the additive particles comprise a material suitable for suppressing grain growth of diamond, also called grain refiner materials.

In one embodiment, the precursor body comprises diamond grains and the additive particles comprise a catalyst material for diamond or a precursor material for a catalyst material for diamond.

In one embodiment, the precursor body comprises cBN grains and the additive particles comprise a precursor material for a binder for PCBN.

In one embodiment, the method includes urging at least two populations of additive particles into the interstices, each population having a substantially different composition, size distribution or structure from that of the other population or populations. In one embodiment, each of at least two populations of additive particles are urged into the precursor body in at least two sequential steps, and in one embodiment, each of at least two populations of additive particles are urged into the precursor body in the same step, or simultaneously.

In one embodiment in which the precursor body comprises diamond grains, a first population of additive particles comprises a catalyst material for diamond, such as cobalt, and a second population of additive particles comprises a ceramic material or a material having a coefficient of thermal expansion (CTE) that is less than the CTE of the catalyst material for diamond, or closer to the CTE of diamond than to the CTE of the catalyst material for diamond.

In one embodiment, the precursor body comprises a binder material, such as an organic binder material, which may hold the superhard grains together. In one embodiment, at least some of the interstices between the superhard grains contain binder material. In one embodiment, at least some of the interstices are at least partially porous.

In one embodiment, the precursor body comprises diamond grains, at least some of which are inter-bonded with each other to form a skeletal mass. In one embodiment, the precursor body comprises PCD material. In one embodiment, the precursor body comprises a green body for making PCD material.

In one embodiment, the method includes preparing a diamond body by providing a PCD body comprising PCD material having interstices at least partly filled with catalyst material for diamond, and treating the PCD body to remove at least some of the catalyst material from at least some of the interstices.

In some embodiments, the precursor body comprises superhard grains having a mean equivalent circle diameter (ECD) of at most about 500 microns, at most about 100 microns, at most about 50 microns or at most about 40 microns. In some embodiments, the precursor body comprises superhard grains having a mean ECD of at least about 1 micron, at least about 10 microns or at least about 20 microns. In one embodiment, the superhard grains have a multimodal size distribution.

In some embodiments, the mean ECD of the additive particles is at least about 20 nanometers, at least about 50 nanometers or at least about 100 nanometers. In some embodiments, the mean ECD of the additive particles is at most about 2 microns, at most about 1 micron, at most about 500 nanometers or even at most about 100 nanometers.

In some embodiments, the mean ECD of the interstices is at least about 5 times, at least about 10 times or even at least about 20 times than that of the additive particles.

In some embodiments, the content of superhard grains within at least a region of the precursor body is at least about 50 volume % or at least about 60 volume % of the precursor body. In some embodiments, the content of superhard grains within at least a region of the precursor body is at most about 85 volume % or at most about 90 volume % of the precursor body.

In some embodiments, the method includes preparing the precursor body by means of EPD, slip casting or other methods known in the art, such as filter pressing, centrifugal casting, gel casting or EPD. In some embodiments, the method includes preparing the precursor body by a method including hot pressing, cold pressing or pre-sintering.

In one embodiment, the additive particles are dispersed and stabilised in a polar medium, and in another embodiment, the additive particles are dispersed and stabilised in a non-aqueous medium.

Some embodiments may be capable of forming a polycrystalline superhard material with an enhanced volume content of superhard grains, which may result in enhanced wear resistance of the material.

Viewed from a further aspect there is provided a polycrystalline superhard material comprising a mass of superhard grains having a mean superhard grain contiguity of at least about 62 percent or at least about 64 percent. In some embodiments, the superhard grain contiguity is at most about 92 percent, at most about 85 percent or even at most about 80 percent.

In some embodiments, the polycrystalline superhard material is PCD and the superhard grains comprise diamond.

In one embodiment, the polycrystalline superhard material is PCBN and the superhard grains comprise cBN.

In some embodiments, the polycrystalline superhard material has an interstitial mean free path of at least about 0.05 microns, at least about 0.1 micron, at least about 0.2 microns or at least about 0.5 microns. In some embodiments, the polycrystalline superhard material has an interstitial mean free path of at most about 1.5 microns, at most about 1.3 microns or at most about 1.0 microns. In some embodiments, the standard deviation of the mean free path is at most about 1 micron or at most about 1.5 micron, and in some embodiments, the standard deviation on the mean free path is at least about 0.05 microns or at least about 0.2 microns.

In some embodiments, the polycrystalline superhard material comprises superhard grains having a mean equivalent circle diameter of at most about 50 microns or at most about 40 microns. In one embodiment, the polycrystalline superhard material comprises inter-bonded superhard grains having a mean equivalent circle diameter of at least about 1 micron or at least about 10 microns.

In some embodiments, the superhard grain content of the polycrystalline superhard material is at least about 70 percent, at least about 80 percent, at least about 88 percent, at least about 90 percent, at least about 92 percent or even at least about 96 percent of the volume of the polycrystalline superhard material. In one embodiment, the superhard grain content of the polycrystalline superhard material is at most about 98 percent of the volume of the polycrystalline superhard material.

In some embodiments, the polycrystalline superhard material is PCD material that comprises a catalyst material for diamond, the content of the catalyst material being at most about 10 volume percent, at most about 8 volume percent, or even at most about 4 volume percent of the PCD material. In one embodiment, the PCD material comprises at least a region that is substantially free of catalyst material for diamond.

Some embodiments may have the advantage that the polycrystalline superhard material has enhanced wear resistance. Embodiments in which the polycrystalline superhard material is PCD may have the advantage that the PCD material has enhanced wear resistance at elevated temperatures, as may be experienced in use.

Viewed from a further aspect there is provided a superhard wear element comprising an embodiment of the aforementioned polycrystalline superhard material.

In one embodiment, the superhard wear element comprises a plurality of regions, each region comprising polycrystalline superhard material having at least one different structural characteristic, non-limiting examples of which may include superhard grain contiguity, mean superhard grain size, superhard grain content, and content of catalyst for diamond. In some embodiments, at least some of the regions are in the form of layers or strata. In one embodiment, at least one of the regions is lean or substantially free of metallic catalyst material for diamond.

In one embodiment, the superhard wear element comprises a structure comprising polycrystalline superhard material joined to a substrate comprising cemented carbide material.

In some embodiments, the superhard wear element is for use in machining, drilling or cutting a workpiece comprising metal.

Some embodiments may have the advantage that the superhard wear elements have extended working life in machining or wear applications.

BRIEF DESCRIPTION

Non-limiting embodiments will now be described with reference to the accompanying drawings in which.

Figure 1:
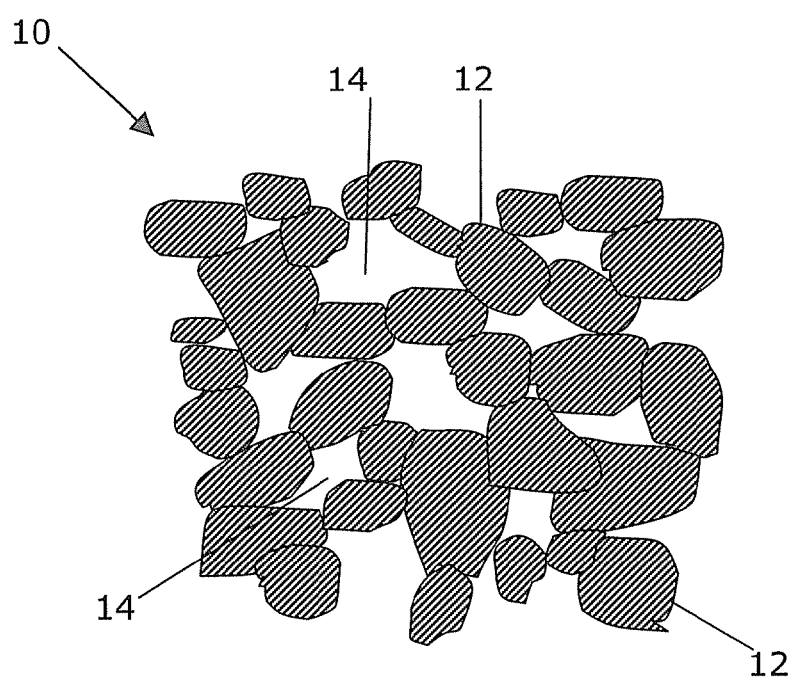
FIG. 1 shows a schematic drawing of the microstructure of an embodiment of polycrystalline superhard material.

The same references are used to refer to the same features in all drawings.

DETAILED DESCRIPTION OF EMBODIMENTS

As used herein, a polycrystalline superhard material is a material having a Vickers hardness of at least about 28 GPa and comprising a mass of superhard such as diamond or cubic boron nitride (cBN). Particular examples of superhard materials are polycrystalline diamond (PCD) and polycrystalline cubic boron nitride (PCBN).

As used herein, polycrystalline diamond (PCD) material is a material comprising a mass of substantially inter-grown diamond grains, forming a skeletal structure defining interstices between the diamond grains, the material comprising at least about 80 volume % of diamond.

As used herein, polycrystalline cubic boron nitride (PCBN) material is a material comprising a mass of cubic boron nitride (cBN) grains bonded together within a wear resistant matrix, the content of the cBN being at least about 40 volume % of the PCBN.

As used herein, a superhard wear element is an element comprising a superhard material and is for use in a wear application, such as degrading, boring into, cutting or machining a workpiece or body comprising a hard or abrasive material.

As used herein, electrophoresis is the motion of dispersed charged additive particles relative to a fluid in which they are suspended, under the influence of an applied static electric field.

As used herein, the equivalent circle diameter (ECD) of a particle is the diameter of a circle having the same area as a cross section through the particle. The ECD size distribution and mean size of a plurality of particles may be measured for individual, unbonded particles or for particles bonded together within a body, by means of image analysis of a cross-section through or a surface of the body.

As used herein, a multimodal size distribution of a mass of grains includes more than one peak, or that can be resolved into a superposition of more than one size distribution each having a single peak, each peak corresponding to a respective "mode". Multimodal polycrystalline bodies are typically made by providing more than one source of a plurality of grains, each source comprising grains having a substantially different average size, and blending together the grains or grains from the sources.

As used herein, a green body is an article that is intended to be sintered or which has been partially sintered, but which has not yet been fully sintered to form an end product. It may generally be self-supporting and may have the general form of the intended finished article.

As used herein, grain contiguity, κ, is a measure of grain-to-grain contact or bonding, or a combination of both contact and bonding, and is calculated according to the following formula using data obtained from image analysis of a polished section of polycrystalline superhard material:

$$\kappa=100*[2*(\delta-\beta)]/[(2*(\delta-\beta))+\delta],$$

where δ is the superhard grain perimeter, and β is the binder perimeter.

The superhard grain perimeter is the fraction of superhard grain surface that is in contact with other superhard grains. It is measured for a given volume as the total grain-to-grain contact area divided by the total superhard grain surface area. The binder perimeter is the fraction of superhard grain surface that is not in contact with other superhard grains. In practice, measurement of contiguity is carried out by means of image analysis of a polished section surface, and the combined lengths of lines passing through all points lying on all grain-to-grain interfaces within the analysed section are summed to determine the superhard grain perimeter, and analogously for the binder perimeter.

With reference to FIG. 1, an embodiment of a polycrystalline superhard material 10 comprises superhard grains 12 having average superhard grain contiguity of about 64 percent. Interstices 14 between the superhard grains 12 are defined by the superhard grains 12. In one embodiment, the superhard grains are diamond grains which are inter-bonded to form a skeletal mass.

Figure 2:
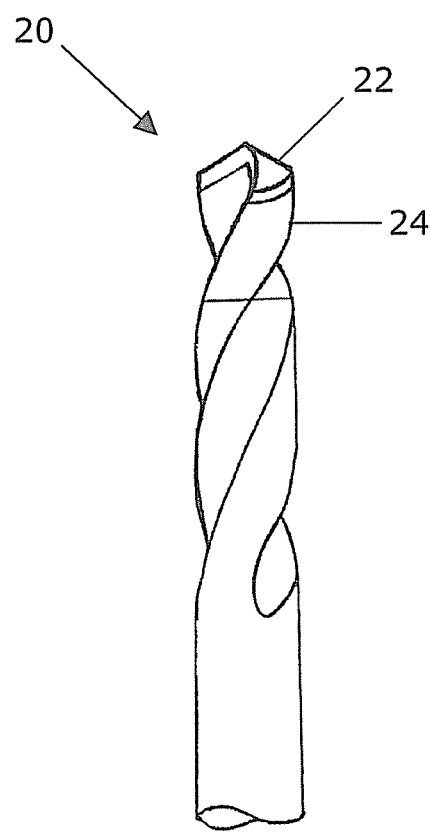
FIG. 2 shows a schematic perspective view of an embodiment of a drill bit for drilling into metal.

With reference to FIG. 2, an embodiment of a superhard element in the form of a drill bit 20 for machining metal (not shown) comprises an embodiment of a superhard structure 22 comprising an embodiment of polycrystalline superhard material, as described with reference to FIG. 1, the polycrystalline superhard structure 22 being joined to a cemented tungsten carbide substrate 24.

Figure 3A:
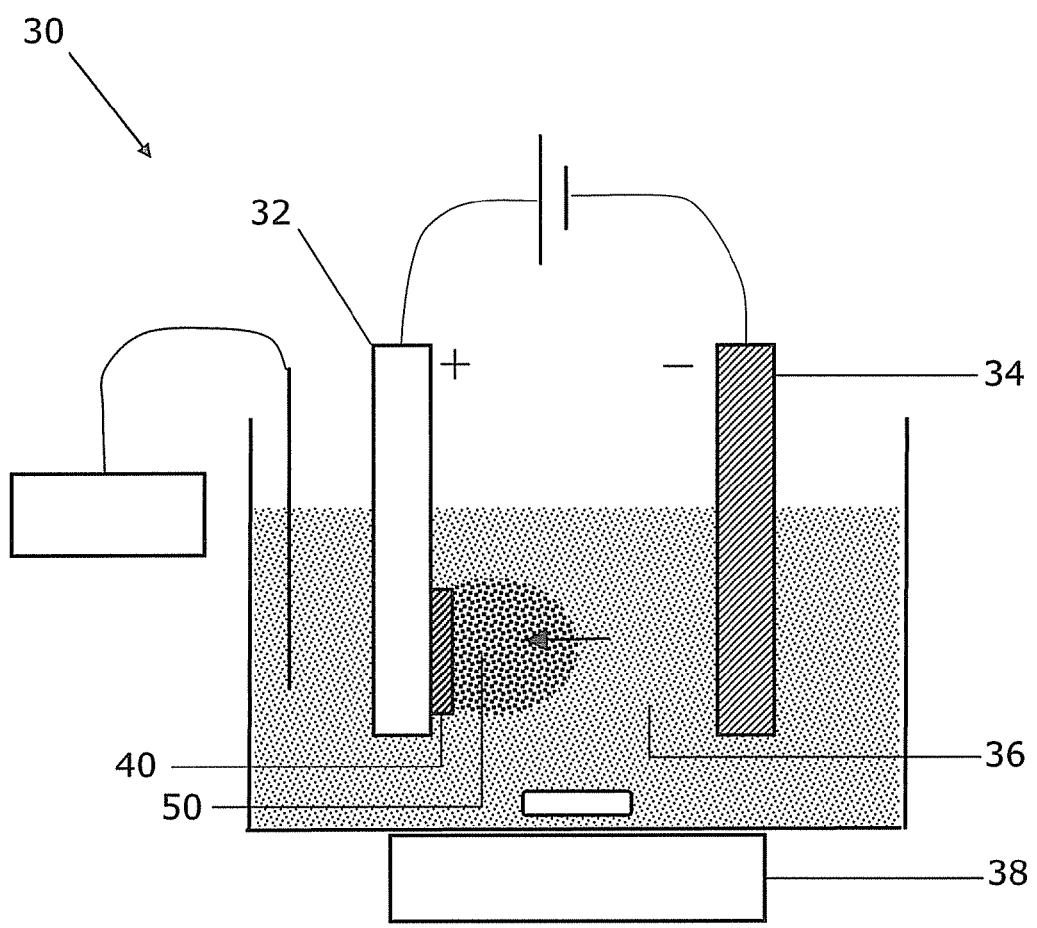
FIG. 3A shows a schematic side view of an electrophoretic cell apparatus.
Figure 3B:
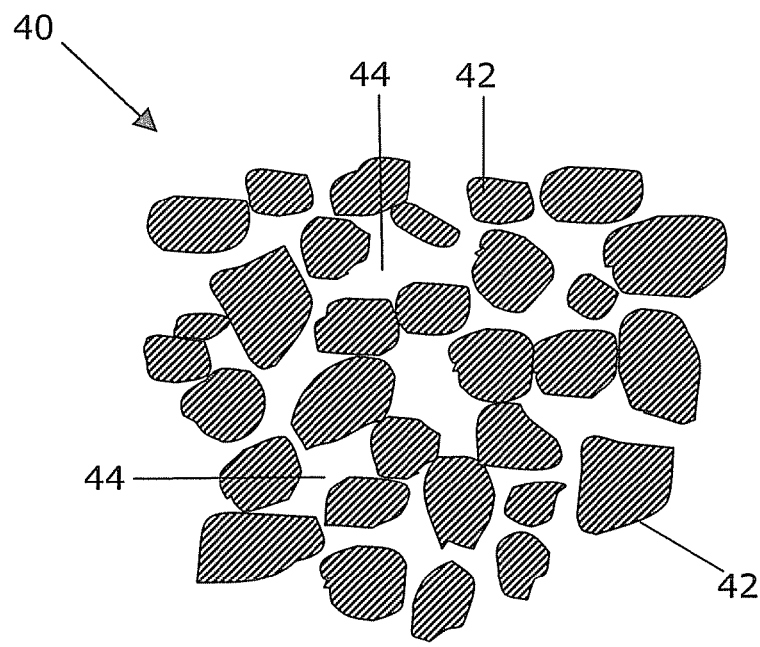
FIG. 3B shows a schematic drawing of the microstructure of an embodiment of a precursor body.
Figure 3C:
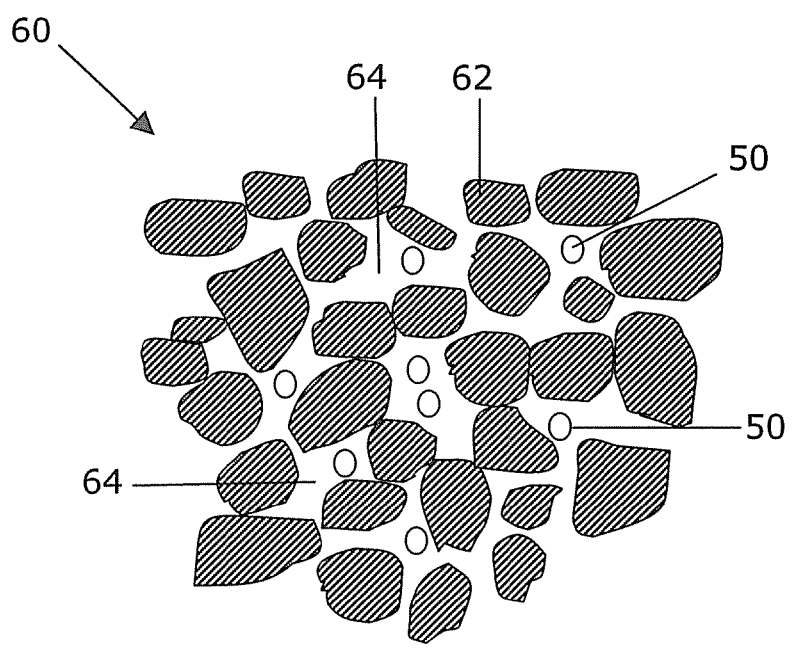
FIG. 3C shows a schematic drawing of the microstructure of an embodiment of a pre-sinter diamond body.

With reference to FIG. 3A, FIG. 3B and FIG. 3C, an embodiment of a method for making an example embodiment of a polycrystalline superhard material includes providing a precursor body 40 comprising superhard grains 42 and interstices 44 between the superhard grains 42, and urging nano-sized superhard additive particles 50 into the interstices 44 of the precursor body 40 by means of an applied electric field to form a pre-sinter body. The precursor body 40 is attached to an anode 32 of an electrophoretic cell 30, with a major surface of the precursor body 40 facing towards a cathode 34. The person skilled in the art will appreciate that very different configurations of the anode and cathode of the electrophoretic cell could be used. For example, they may be arranged to lie horizontally with one above the other, or they may be cylindrically co-axial. The precursor body 40 and at least a portion of the cathode 34 is immersed in a stable aqueous suspension 36 containing additive particles 50 having a mean size of about 50 nm. A magnetic stirrer 38 is used to maintain additive particles in suspension. In an example embodiment, a DC potential of about 200V may be applied for about 5 minutes to generate the electric field between the anode 32 and cathode 34 to draw the additive particles 50 from the suspension 36 into interstices within the precursor body 40. The person skilled in the art will appreciate the process conditions, such as the acidity of the suspension, the type and quantity of dispersants and the additive particle surface chemistry can be optimised. The resulting pre-sinter body having microstructure 60 comprising superhard grains 62 and interstices 64, at least some of which contain the additive particles 50, is then removed from the cell 30, dried and then sintered.

In embodiments where the precursor body comprises diamond grains, the pre-sinter body may be sintered by subjecting it in the presence of a catalyst material for diamond to a temperature of about 1,350 degrees centigrade and a pressure of about 5.5 GPa to form an embodiment of PCD material.

An ion permeable membrane may be placed between the anode and the cathode in the electrophoretic cell. This may have the advantage of allowing ions to pass through it between the anode and the precursor body, while shielding the precursor body from gas that may evolve at the anode surface, which may disrupt the electrophoretic deposition process and reduce the efficiency of electrophoretic deposition of the additive particles into the interstices of the precursor body.

Diamond grains typically have a negative charge and would tend to migrate towards a positively changed electrode the anode. Diamond particles usually have a negative surface charge when suspended in aqueous or organic medium, which may render them capable of being urged to move in an electric field. In some embodiments, it is not necessary to provide the diamond additive particles in suspension with additional charge. Any solution that makes available an excess of H+ protons in solution would result in the diamond acquiring a positive charge, e.g. pre-washing the diamond in dilute (15%) hydrochloric acid followed by washing with deionised water to remove all traces of chloride ions), or by exposing the diamond to a solution of acetone and iodine (as in U.S. Pat. No. 6,258,237).

In some embodiments, ultrasonic, magnetic stirrer or other suitable agitation treatment of the suspension of additive particles may assist in ensuring a homogeneous suspension and deposition of the additive particles. In embodiments where the additive particles are nano-sized diamond particles, mere stirring may be sufficient.

The additive particles may be evident in the sintered polycrystalline superhard material or they may have substantially dissolved during the sintering step, depending on the sintering conditions, particularly the sintering time. In embodiments where the polycrystalline superhard material is PCD, the longer the sintering time in the presence of a catalyst material for diamond, the less likely it would generally be for the nano-particles to be evident in the PCD material.

In embodiments in which the precursor body comprises diamond grains, the use of additive particles comprising catalyst material for diamond or other non-diamond material, or both, may result in improved inter-bonding between the diamond grains and thus diamond contiguity, as well as enhanced strength of the sintered PCD. While wishing not to be bound by any particular hypothesis, this may result at least partly because the method substantially avoids interposing the additive particles between neighbouring diamond grains at points at which they contact each other, as may arise in the case of other methods of introducing the additive particles, such as by mixing. In this way, increased direct inter-bonding of neighbouring diamond grains may arise during sintering.

United Stated states patent application publication number 2004/053767 discloses a process in which a porous green body made from amorphous $SiO_2$ is further densified by means of electrophoretic deposition of $SiO_2$ particles in the pores of the green body. U.S. Pat. No. 6,699,808 discloses a homogeneous dispersion of amorphous $SiO_2$ particles in a dispersion medium, wherein the dispersion has a solids content of at least 80% by weight of amorphous $SiO_2$ particles and the amorphous $SiO_2$ particles have a bimodal particle size distribution.

Electrophoresis of diamond particles is also known (Fabrication of diamond Schottky emitter array by using electrophoresis pre-treatment and hot-filament chemical vapor deposition, *Diamond and Related Materials*; Volume 16, Issues 4-7, April-July 2007, Pages 1398-1402, Proceedings of Diamond 2006, the 17th European Conference on Diamond, Diamond-Like Materials, Carbon U.S. Pat. No. 6,258,237 discloses a method of depositing diamond particles on a surface of a substrate, the method comprising the steps of (a) charging the diamond particles by a positive charge to obtain positively charged diamond particles; and (b) electrophoretically depositing the positively charged diamond particles on the surface of the substrate, for obtaining a green diamond particles coat on the surface of the substrate.

Alternative methods of drawing the additive particles into the interstices of a precursor body may be used. Non-limiting examples of alternative methods may include filter pressing, gel casting, slip casting or centrifugal casting.

Contiguity is measured using SEM images of a polished section or surface of a PCD element by means of image analysis software. In particular, software having the trade name analySIS Pro from Soft Imaging System® GmbH (a trademark of Olympus Soft Imaging Solutions GmbH) may be used. This software has a "Separate Grains" filter, which according to the operating manual only provides satisfactory results if the structures to be separated are closed structures. Therefore, it is important to fill up any holes before applying this filter. The "Morph. Close" command, for example, may be used or help may be obtained from the "Fillhole" module. In addition to this filter, the "Separator" is another powerful filter available for grain separation. This separator can also be applied to color- and gray-value images, according to the operating manual.

Images used for the image analysis should be obtained by means of scanning electron micrographs (SEM) taken using a backscattered electron signal. Optical micrographs generally do not have sufficient depth of focus and give substantially different contrast. Adequate contrast is important for the measurement of contiguity since inter-grain boundaries may be identified on the basis of grey scale contrast.

Some embodiments may exhibit enhanced wear resistance. While wishing not to be bound by any particular hypothesis, this may be a result of an increased content of superhard material and increased contact or inter-growth among the superhard grains.

EXAMPLES

Embodiments are described in more detail with reference to the examples below, which are not intended to be limiting.

Example 1

A tape comprising about 0.5 weight % diamond particles having a mean size of about 30 microns and an alcohol based organic binder was prepared by means of slip casting. The binder was then partially removed from the tape by heating it to between about 150 and 220 degrees centigrade in air, producing a porous tape having about 62% of theoretical density and mean pore size of approximately 3 microns. The residual binder in the green tape ensured that it held together sufficiently. Precursor discs having diameter of about 17 mm were then cut from the porous tape.

A precursor disc was introduced into an electrophoretic cell together with a stable aqueous suspension containing 2.5 volume % of diamond nano-particles having a mean size of about 50 nm. The diamond nano-particles were suspended in about 97.5 ml of deionised water containing 0.5% tetramethylammonium hydroxide as supporting electrolyte. The cell was arranged so that the precursor disc could function as an anode and a Pt-coated Ti element could function as a cathode in use, with a flat surface of the precursor disc facing the cathode. A DC potential of about 200V was applied for 5 minutes to draw the diamond nano-particles from the suspension into the pores of the precursor disc to form a pre-sinter disc. The pre-sinter disc was then removed from the cell and dried in an oven at about 100 degrees centigrade overnight. Analysis of the dried pre-sinter disc revealed that its density was about 70% of theoretical density.

A pre-sinter assembly was made by placing the pre-sinter disc onto a cylindrical substrate of cobalt-cemented tungsten carbide and assembling these into a capsule for treatment in an ultra-high pressure furnace, as is well known in the art. The pre-sinter assembly was then subjected to treatment at a pressure of about 5.5 GPa and a temperature of about 1,350 degrees centigrade for about 15 minutes to produce a sintered polycrystalline diamond (PCD) layer joined to the substrate. As is well known, the sintering of the diamond particles was catalysed by molten cobalt drawn from the substrate, resulting in a cobalt content of about 7.7 volume % in the PCD. Image analysis of the PCD revealed that the contiguity of the inter-bonded skeletal mass of diamond particles was about 66.2%. Microscopy analysis further revealed that the nano-particles were substantially not present in the final sintered PCD. According to one hypothesis, the nano-particles had dissolved and re-precipitated as diamond material at inter-bonding "necks" between bonded diamond particles, thereby improving the strength of the sintered PCD material.

For comparison, a control PCD sample was made by including the diamond nano-particles within a precursor disc by blending them with coarser diamond particles having a mean size of about 30 microns before adding the binder. The weight ratio of the diamond nano-particles to the coarser diamond particles was about 1 to 20. The mixture of nano-particles and coarser particles was subjected to high shear mixing in an ethanol based liquid medium to ensure good blending and then dried. A precursor disc was cut from the tape and was found to have a density of about 59% of theoretical density. The disc was assembled and treated in an ultra-high pressure furnace as described above. Analysis revealed that the cobalt content in the sintered PCD was about 8.4 volume % and the diamond contiguity was about 62.1%.

Example 2

Another pre-sinter assembly was prepared as described in Example 1 and treated at the same pressure and temperature as described in Example 1, except that the period of treatment at the ultra-high pressure and temperature was only 2 minutes. When the PCD thus produced was analysed, diamond nano-particles were evident, indicating that they had not completely dissolved as in Example 1.

Example 3

Another precursor disc cut from the porous tape of Example 1 was introduced into an electrophoretic deposition cell as in Example 1, except that zirconia ($ZrO_2$) 2.5 volume % of nano-particles were suspended in the stable aqueous suspension instead of diamond nano-particles were used. The mean size of the zirconia nano-particles was also about 50 nm. After the electrophoretic process and the drying of the precursor disc to form a pre-sinter disc, the pre-sinter disc was assembled with a substrate in a capsule for an ultra-high pressure furnace and sintered at a pressure of about 5.5 GPa and a temperature of about 1,350 degrees centigrade. The sintered PCD had a diamond contiguity of 63.1% and a cobalt content of 7.2%.

The invention claimed is:

1. A method for making polycrystalline superhard material comprising introducing, to a precursor body comprising superhard grains and interstices between the superhard grains, additive particles into the interstices to form a pre-sinter body, the step of introducing the additive particles comprising urging, driving or drawing the additive particles into the interstices by means of an applied electric field to electrophoretically deposit the additive particles into the interstices; and subjecting the pre-sinter body to a temperature and pressure at which superhard material is thermodynamically stable, sintering it and forming polycrystalline superhard material.

2. A method as claimed in claim 1, in which the precursor body comprises diamond grains and the method includes subjecting the pre-sinter body in the presence of a catalyst material for diamond to a pressure and temperature at which diamond is more thermally stable than graphite.

3. A method as claimed in claim 1, in which the additive particles comprise diamond, graphite, cubic boron nitride (cBN), hexagonal boron nitride (hBN), metal or ceramic material.

4. A method as claimed in claim 1, in which the additive particles comprise a catalyst material for diamond or a precursor material for a catalyst material for diamond.

5. A method as claimed in claim 1, in which the precursor body comprises superhard grains having a mean equivalent circle diameter (ECD) of at most 500 microns and at least 10 microns.

6. A method as claimed in claim 1, in which the interstices within the precursor body comprise pores having a mean ECD of at least about 5 times the mean ECD of the additive particles.

7. A method as claimed in claim 1, in which the additive particles have a mean ECD of at least 20 nanometers and at most 1 micron.

8. A method as claimed in claim 1, in which the interstices have a mean ECD of at least 5 times that of the additive particles.

* * * * *